United States Patent [19]

Marusiak et al.

[11] Patent Number: 4,615,482
[45] Date of Patent: Oct. 7, 1986

[54] MULTI-WAY FLUID FLOW CONTROL VALVE

[75] Inventors: Wojciech Marusiak, Düsseldorf; Wolfgang Sommer, Hilden, both of Fed. Rep. of Germany

[73] Assignee: Pierburg GmbH & Co. KG, Neuss, Fed. Rep. of Germany

[21] Appl. No.: 707,731

[22] Filed: Mar. 4, 1985

[30] Foreign Application Priority Data

Mar. 3, 1984 [DE] Fed. Rep. of Germany ....... 3407990

[51] Int. Cl.$^4$ ........................................... G05D 23/10
[52] U.S. Cl. .................................. 236/48 R; 236/87; 236/101 C
[58] Field of Search ................... 236/48 R, 87, 101 A, 236/101 C, 93 R

[56] References Cited

U.S. PATENT DOCUMENTS

| | | | |
|---|---|---|---|
| 3,749,128 | 7/1973 | Sallberg et al. | 137/625.65 X |
| 4,029,257 | 6/1977 | Jenkins et al. | 236/48 R |
| 4,068,800 | 1/1978 | Doherty, Jr. | 236/48 R X |
| 4,103,824 | 8/1978 | Seifert | 236/48 R X |
| 4,132,239 | 1/1979 | Bowen et al. | 236/101 C X |
| 4,460,124 | 7/1984 | Chalmin et al. | 236/48 R |

Primary Examiner—William E. Tapolcai
Attorney, Agent, or Firm—Toren, McGeady, Stanger, Goldberg & Kiel

[57] ABSTRACT

A temperature-dependently actuated 3-port, 2-way valve 1 has a bimetallic disc 22 which closes either a valve seat 15, as shown, or a valve seat 14 when it snaps over into an upwardly domed position. The disc 22 is floatingly supported by two 3-legged springs 23 and 24 acting on its opposite sides. When, as shown, the disc is downwardly domed, only the upper spring 23 acts on the disc 22 and the legs of the lower spring 24 act against abutments 26. The reverse happens when the disc is upwardly domed. In this way the disc is always pressed against one seat or the other only by the appropriate spring and the closure force is independent of the flexural strength of the disc. The floating support of the disc 22 also ensures that it snaps over at or very near the correct operating temperature.

13 Claims, 7 Drawing Figures

MULTI-WAY FLUID FLOW CONTROL VALVE

This invention relates to temperature-dependently actuated fluid flow control valves, for example a 3-port, 2-way valve, comprising two housing parts having valve seats and a bimetallic disc between the seats, the disc being able to deflect between two positions in which it closes different seats to alter the fluid flow path through the valve.

In order that the flow path between an inlet opening and an outlet opening of a 2-port valve may be continuously controlled, it is known from DE-A-2 462 265 to provide a bimetallic disc on a valve seat in the path between the inlet and outlet openings. The disc changes its curvature between a first position and a second position as a function of the temperature changes. In this manner the path between the inlet opening and the outlet opening can be blocked or opened, the bimetallic disc deflecting between each of its two positions when a specific temperature is reached. Slits disposed in the bimetallic disc are intended to influence the mechanical stresses occurring in it and make the transition between the two positions no longer sudden, but continual or gradual. It is furthermore known from this specification to hold the bimetallic disc by means of a three-armed spring disc sealingly against the valve seat, when the disc is situated in its closed, second position. For this purpose the spring acts from one side of the disc on the middle of the bimetallic disc and presses the disc against the valve seat. The spring does not, however exert any influence at all upon the actuation behaviour of the bimetallic disc.

In a valve as initially described it has already been disclosed in DE-A- 2 645 165, to use a bimetallic disc disposed between two valve seats to provide temperature-dependent switching over or actuation from the closure of one seat to the closure of the other seat. Reliable switching over, not influenced by temperatures other than the temperature of a reference heat source, is intended to be achieved in this valve by a heat-conducting cartridge consisting of a lower and an upper unit. This cartridge has a seating for the valve body constructed as a bimetallic disc. The cartridge serves as a temperature sensor, towards which heat flows substantially from all directions in the same manner, whereupon, when a predetermined temperature in the cartridge is reached, the bimetallic disc snaps or deflects over into a different geometry.

In the case of pneumatic or electrical switching devices equipped with bimetallic discs, it is of importance particularly that the function period of the thermo-time valves or switches can be adjusted in a reproducible manner which can be determined in advance. In this connection, some indispensible boundary conditions must not be ignored where a bimetallic disc is used, these are: the smallest possible dimensions, i.e. a small diameter; the largest possible deflection in the region of the change-over temperature, in which condition the force equilibrium in the disc is no longer present and the disc suddenly snaps over; the switching or actuation temperature must not exceed a tolerance of $+/-3°$ C. with a switching hysteresis of about $10°$ C., and the device must be capable of withstanding a temperature from $-30°$ C. to $+150°$ C. without suffering damage or adverse effect upon its functions.

These requirements have, in known thermo-time valves having only one switching direction, led to the bimetallic disc being loaded from one side with a constant force, apart from other supporting measures, for example, in a 2-port, 2-way valve in automobile engines, where it is important for the warming-up enrichment of the fuel-air mixture to be effected for a specific period after the ignition has been switched on. In a bimetallic disc loaded, for example, by a spring, the switching temperatures can be displaced, since the spring force produces a shift of the neutral axis or the bending axis of the bimetallic disc; the bending axis corresponds to the central axis of the neutral plane or the bending place between the two domed positions of the disc.

The provision of a 2-port, 2-way valve possessing only one actuating dirction with a bimetallic disc spring-loaded on one side is relatively unproblematical, since the disc in any case can freely deflect in one direction. By contrast, in the case of a bimetallic disc without free deflection, a force is produced which is in a specific relationship to the temperature change. For the free deflection A and the force P in suppressed deflection, the following equations apply:

$$A = \frac{a \times \Delta T \times D^2}{4 \times S} \text{ (mm)}$$

$$P = 4 \times S^3 \times A \times E \text{ (kp)}$$

In these equations, the symbols have the following means: a=specific thermal deflection, $\Delta T$=temperature difference in $°$ C., D=diameter of disc in mm, S=thickness of disc in mm, E=modulus of elasticity in $kp/mm^2$.

Taking note of the aforementioned boundary conditions, mutually contradictory requirements arise at some points from the two equations. The maximum diameter of the disc is between 14 and 30 mm and can be assumed constant. The free cross-sections in known pneumatic switches must correspond to a diameter of about 2 mm, from which a minimum deflection of 0.5 mm is derived at the switching point; in this connection the maximum tolerance of the switching temperature of $6°$ C. must be noted. The specific thermal deflection is fixed by the quality of the material of which the disc is made, which can be varied only within specific limits, if at all, and therefore likewise may be regarded as constant. The sole variable parameter which remains is the thickness of the bimetallic disc. In order to achieve the desired large deflection, the thickness must be as small as possible. In this connection the requirement of a working range from $-30°$ C. to $+150°$ C. must be observed. This inevitably assumes a very large free deflection or, in the case of suppressed deflection, leads to very high forces. The obstacle to this, however, is the limit of admissible force $P_{zul}$ according to the following equation:

$$P_{zul} = \frac{2 \times \delta_{zul} \times S^2}{3}$$

This means that the smaller the thickness of the bimetallic disc becomes, the smaller the admissible force is, in accordance with a square law. As a consequence thereof, either the bimetallic disc must be made thicker, with the drawback of a smaller deflection at the switching point, or a free deflection outside the switching points must be possible. This must be the reason why these requirements can be satisfied in the case of the 2-port, 2-way valve which is disclosed in DE-PS 2 903

561, but not in the case of a 3-port, 2-way valve, since in such valves these requirements must be simultaneously satisfied in both switching directions.

The object of the present invention is to provide a 3-port, 2-way valve which satisfies the aforementioned requirements, which uses a bimetallic disc as a switching element, and in which the disc experiences a defined loading at the switching points with the desired switching tolerance.

To this end according to this invention, a valve as initially described is characterised in that the bimetallic disc is floatingly mounted and is supported at its edge regions by springs alternatively on both sides, the disc being spring supported on one side when in one position to hold one seat closed and on the other side when in the other position to hold another seat closed.

With this arrangement, the floating bimetallic disc which is not limited in its movement by any fixed stop, for example a shoulder on the housing, can freely deform at temperature changes beyond the switching points, without being loaded by unacceptable stresses or forces which would adversely affect the switching behaviour. Independently of the changeover direction, a defined spacing exists between the bimetallic disc and the valve seating before switching over. The bimetallic disc is nevertheless loaded in each switching position against the seat by a specific spring force, because in one switching position always only one side of the disc is actively loaded, while the other side is load-free or substantially so.

To support the bimetallic disc with a specific force, this support is preferably provided by oppositely situated springs having spring legs which are angularly offset from one another on the two sides of the disc; in particular the two springs preferably each have three legs, the legs of one spring being angularly offset by 60° from those of the other spring and extending into recesses which are distributed around the perimeter of the housing. In the housing recesses, abutment edges which extend above and below the plane of the bimetallic disc are preferably disposed. The legs of the springs bear against the abutment edges when they are inoperative to ensure the free deflection behaviour of the bimetallic disc in both directions of actuation, since the abutment edges limit the travel of the spring legs. The spring legs bear against the abutment edges and are thus prevented from following the disc and its edge regions which are deflected as the disc snaps over into the other switched position. The disc deflects uninfluenced by additional forces except for those of the operative spring on its edge region opposite to the valve seating which it is closing. As the disc deflects, its edge region comes into engagement with the operative spring, which then loads the bimetallic disc after deflection in a defined manner. When switching over into the other direction, this procedure takes place in reverse and the other spring alone becomes operative.

In order to simplify assembly of the valve and construction of the recesses with the abutment edges, a separate intermediate component, enclosed by the housing components and having a valve seating is preferably provided. The intermediate component preferably has wall projections provided with crown-like recesses disposed around its perimeter. When the valve is assembled, the lower edges of the crown-like recesses form the abutment edges for the legs of the three-leg spring inserted into an upper part of the housing. The abutment edges for the legs of the other three-leg spring adjacent the intermediate component are, on the other hand, situated directly on the upper housing component.

The valve seats formed on the upper housing component of the valve and on the intermediate component preferably have collar-like projections around them. Then the springs have spring arms which bear externally against the collar-like projections. These spring arms, which are not bent completely perpendicularly to the springs, are resiliently prestressed and, when the three-leg springs are inserted into the housing they press from the outside with a spring force against the collar-like projections. By providing each three-leg spring with at least one peripheral spring leaf which engages between abutments, the installed position of the three-leg springs can be still further secured. The three-leg springs may each have three spring leaves, offset from one another by 120°, of which at least one leaf is then fixed between a pair of stop pins in the housing as a precaution against rotation of the spring in the housing.

An example of a valve in accordance with the invention is illustrated in the accompanying drawings in which.

Figure 1:
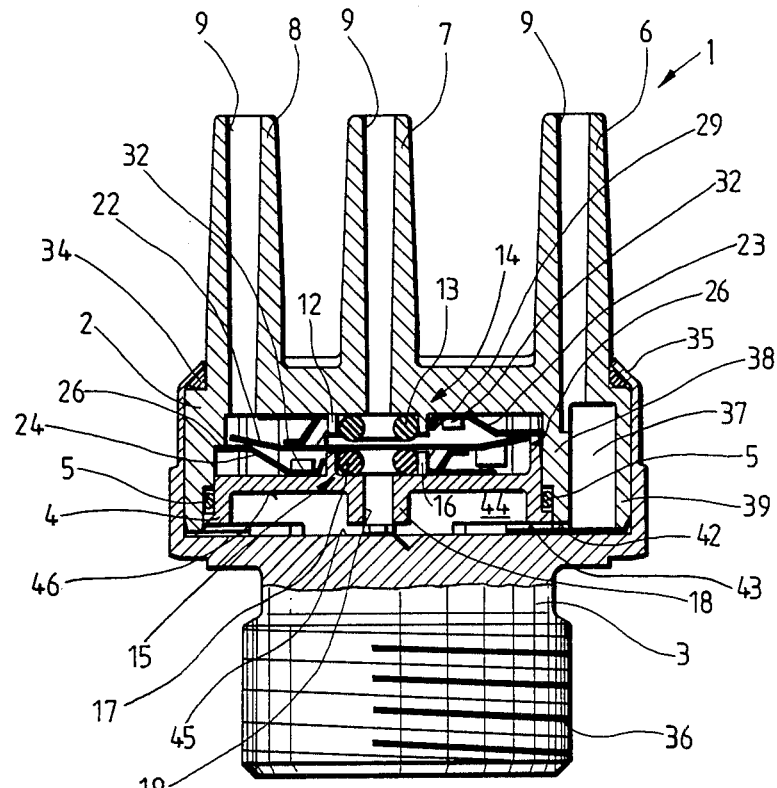
FIG. 1 is a section through the valve.

The 3-port, 2-way valve 1 illustrated in the drawings may be used, for example, in automobile engines. In the example illustrated, a housing upper part 2, which is preferably constructed as a plastics injection moulded component, is sealingly and firmly connected to a housing lower part 3, which is preferably constructed as an aluminum pressure cast component. The housing upper part 2 and housing lower part 3 enclose an intermediate component 4 which is preferably made as a zinc alloy pressure die casting and which is sealed against the housing upper part 2 by means of a sealing ring 5. The necessary fluid connections are injection moulded integrally with the upper part 2, for example an inlet 6 may be connected with a fluid pressure source, an outlet 7 with a vent and a connection 8 with a device to be operated by fluid pressure, such as an actuator cell. The connections 6 to 8 have central through bores 9, tapering inwardly gradually from the upper end of the connection to the interior of the housing. The through bore of the central connection 7 is surrounded by a collar 12 which continues into the interior of the housing. The collar forms together with a round-section sealing ring 13 inserted therein, a first valve seating 14.

Figures 6, 7:
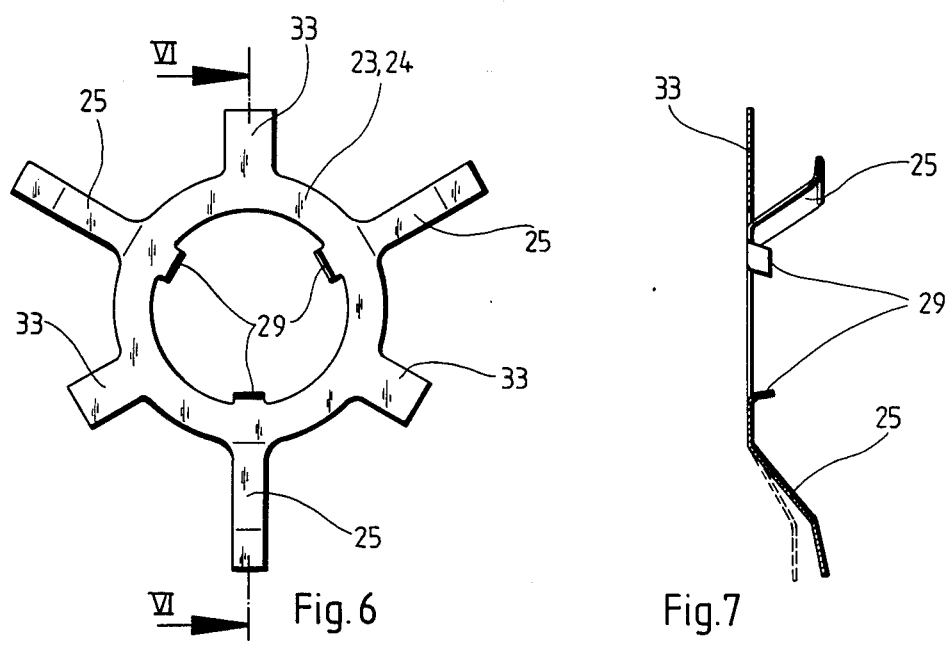
FIG. 6 is a plan view of a three-leg spring forming part of the valve.
FIG. 7 is a section through the three-leg spring as seen in the direction of the arrows on the line VI—VI in FIG. 6;.

Facing the first valve seating 14 at a distance therefrom and coaxial therewith, there is a second valve seating 15, which is formed by a collar 16 on the disc-like intermediate component 4 and a round-section sealing ring 17 inserted therein. The valve seating 15 forms a continuation of a hub-like projection 18 with a through bore 19 in the intermediate component 4. Between the valve seatings 14, 15, with their circular-section sealing rings 13, 17, which are preferably of a suitable elastic, synthetic or natural rubber having a clean, dry and non-stick surface, which in addition must be resistant to liquids used in internal combustion engines such as petrol, benzol and oil, there is a floatingly mounted bimetallic disc 22. Associated with the upper and lower side respectively of the bimetallic disc 22 are three-leg springs 23 and 24. These springs are angularly offset by 60° from each other about the centre of the disc 22 so that the spring legs 25 of one or other of the springs, depending upon the switched position of the bimetallic disc 22 (see FIGS. 6 and 7) that is either of the three-leg spring 23 or of the spring 24, act upon the edge region of the bimetallic disc 22. The three-leg spring which at any time is out of action bears with its spring legs against abutment edges 26 of recesses 27, 28 and 52 formed in the housing upper part 2 and in the intermediate component 4 respectively.

In the actuated or switched position illustrated in FIG. 1, the bimetallic disc 22 closes the valve seat 15, the edge regions of the disc being bent upwards in this geometry of the bimetallic disc 22 and thus coming into contact with the spring legs 25 of the upper three-leg spring 23, which acts by means of spring arms 29 against the external perimeter of the collar 12 of the housing upper part 2. Since the spring legs 25 of the lower three-leg spring 24 bear against the abutment edges 26 of the housing upper part 2, they cannot follow the deflecting bimetallic disc 22 further. This has the result that adverse force of the three-leg spring 24, which is not required in this switched position, is prevented from acting on the disc. The reverse takes place in the second switched position, i.e. when the disc 22 is upwardly domed and the valve seat 14 is closed. In this case the spring legs 25 of the upper three-leg spring 23, bear against the abutment edges 26 of the intermediate component 4, so that after snapping over of the bimetallic disc 22 only the lower three-leg spring 24 acts upon the edge region of the underside of the disc. Because the abutment edges 26 limit the spring travel, assurance is provided that the three-leg springs 23, 24 only act in their intended directions. In order that the three-leg springs 23 and 24 illustrated in FIGS. 6 and 7, shall not change their positions when snapped onto the collars 12, 16 respectively and offset by 60° from the other springs 24 or 23, two stop pins 32 are provided on the housing upper part 2 and on the intermediate component 4, between which pins the three-leg spring engages with a spring leaf 33.

So that a choice shall be available when assembling the valve, the three-leg springs each have in total three spring leaves 33, spaced around the periphery at 120° intervals; and independently of which of the spring leaves 33 engages between the stop pins 32, there is always a constant angular displacement of the spring legs 25 of the three-leg springs 23, 24 which bear at points on the edge regions of the bimetallic disc 22.

As can be seen from FIG. 1, the housing lower part 3 and the housing upper part 2 which is inserted into it are sealingly connected together. This can be achieved by the enclosure of a pushed-on seal 34 by simply bending over the wall 35 of the housing lower part 3. The valve 1 is especially suitable for screwing into the engine block of an automobile, for which purpose the housing lower part 3 has a screw-threaded projection 36. In this way the heat from the engine block is transmitted via the screwed-in housing lower part 3 which has a high thermal conductivity to the bimetallic disc 22, so that the disc heats up correspondingly to the temperature rise of the engine block and snaps over into the second switched position at a desired temperature. In the starting switching position shown, the valve seating 15 is closed by the bimetallic disc and the connection 7 is in communication with the connection 8. Fluid entering through the connection 6 thus passes into a distributor chamber 37 adjoining thereto, which is formed by a wall 39, extending eccentrically to the wall 38 of the housing upper part 2, and passes thence via an aperture 42 in the wall 38 in the region of the chamber 37 and via apertures 43 in the wall of the intermediate component 4 into a free space 44, which is bounded by an internal floor surface 45 of the housing lower part 3 and the intermediate component 4 which has an annular surface 46 set back from the hub-like projection 18. Since the intermediate component 4 is sealed by means of the sealing ring 5 to the wall 38 of the housing upper part 2 and the bimetallic disc 22 closes the valve seating 15, the fluid which has flowed in cannot flow further until the bimetallic disc 22 has snapped over into the other switching position, in which it closes the valve seating 14. Thereafter the fluid supplied via the connection 6 can flow via the bore 19 of the hub-like projection 18 and the opened valve seating 15 and then out through the connection 8.

Figure 2:
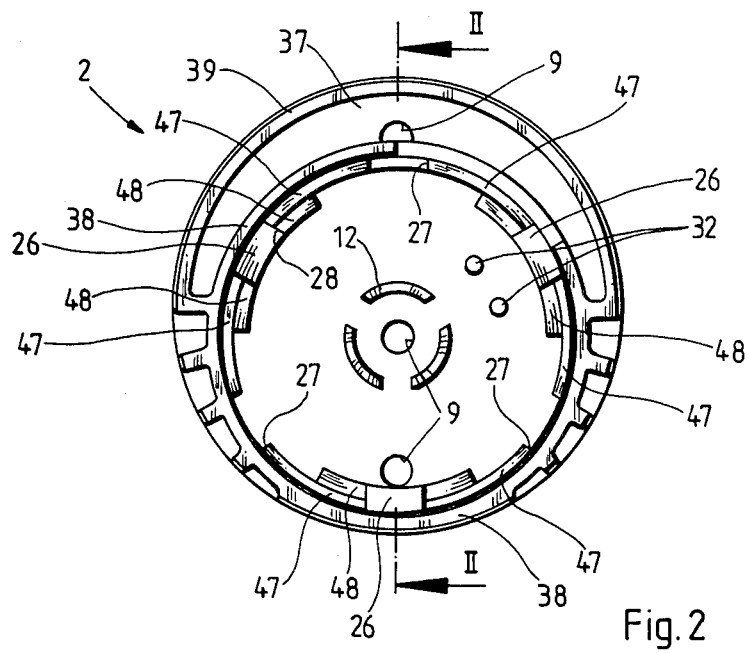
FIG. 2 is an underneath plan view of an upper housing part of the valve.
Figure 3:
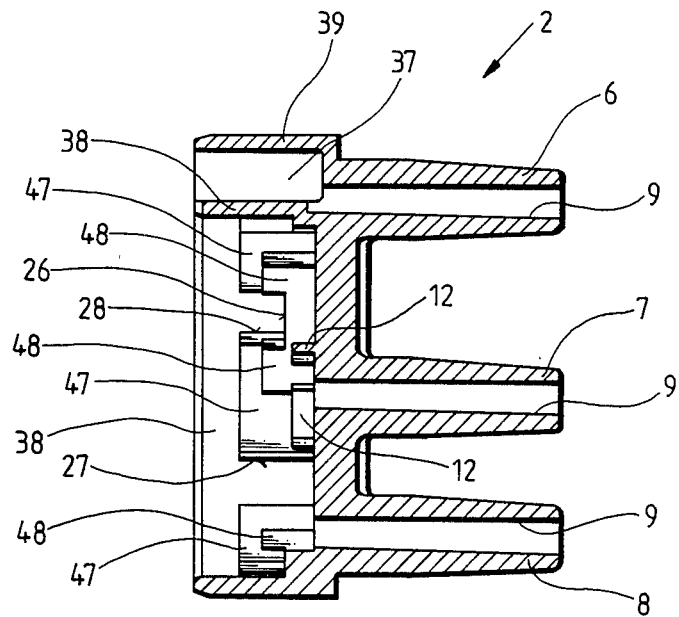
FIG. 3 is a section of the upper housing upper part as seen in the direction of the arrows in the line II—II of FIG. 2.

FIGS. 2 and 3 which illustrate the housing upper part 2 as a single component, show the housing recesses 27, 28 with their abutment edges 26, which are essential for separating the ranges of action of the three-leg springs 23 and 24. The outer wall 38 has for this purpose additional inwardly oriented wall projections 47, 48 of different heights. By the higher projections 47 a total of six wall projections distributed at intervals around the periphery are provided, associated with which are wall projections 48 of smaller height, which form the abutment edges 26 for the three-leg spring 24, mounted as shown in FIG. 1 on the intermediate component 4. Each alternate slit-like recess 27, separating the projections 47 from one another, is bridged across by a projection 28.

Figure 4:
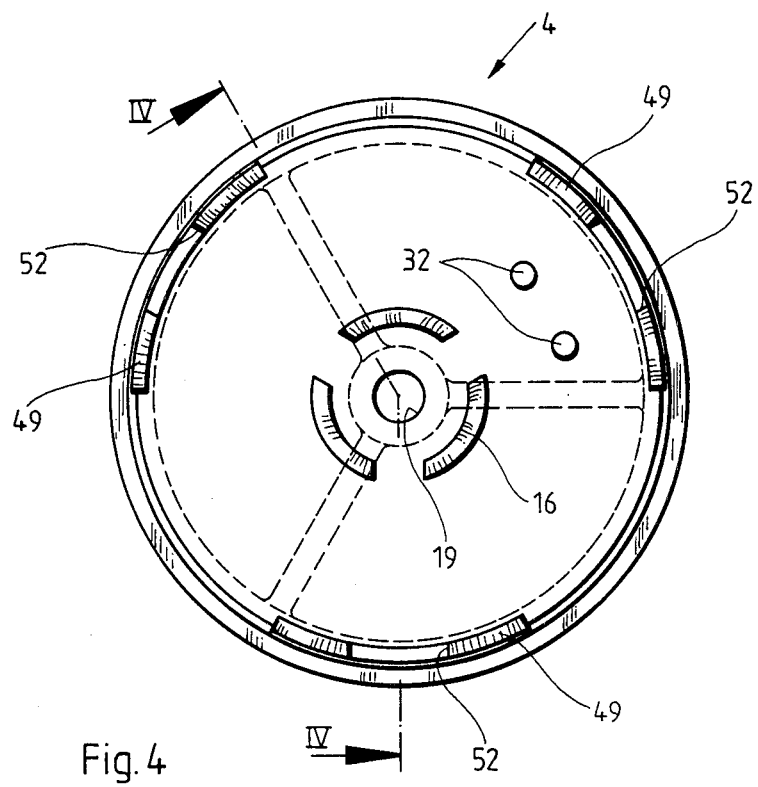
FIG. 4 is a plan view of an intermediate component enclosed between the upper and a lower housing part of the valve.
Figure 5:
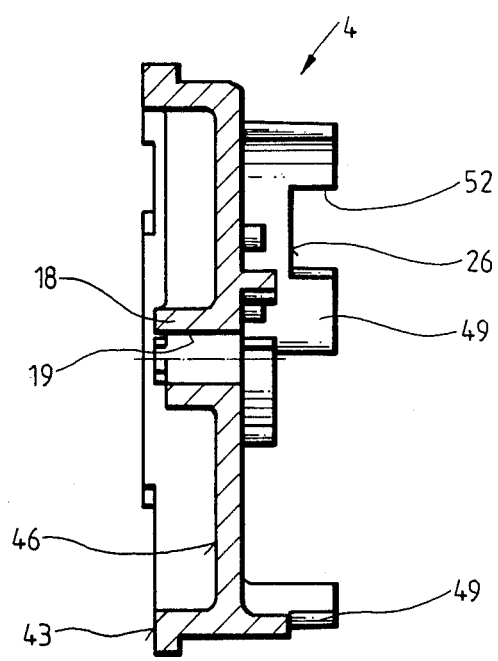
FIG. 5 is a section through the intermediate component as seen in the direction of the arrows on the line IV—IV of FIG. 4.

The spring legs of the three-leg spring 23, snapped onto the collar 12 of the housing upper part 2, project, by contrast, into the slit-like recesses 27 which are not bridged across by the wall projections 48, between two of the higher wall projections 47. In order that the travel of the spring legs of the spring 23 shall also be limited, the intermediate component illustrated in FIGS. 4 and 5 is provided with wall portions 49 distributed around it and crown-like recesses 52 formed into them, the lower edge of a recess 52 in the assembled state of the valve 1 constituting an abutment edge 26 for the legs of the three-leg spring 23. The installation of the intermediate component 4 is effected by pushing the wall portions 49 with the recesses 52 each in front of the continuous slit-like recesses 27 between two walls 47 of the housing upper part 2, which do not possess any wall projections 48. The wall parts 49 of the intermediate component 4 may therefore be compared with the fixed wall projections 48. They then fulfill the same function of limiting the travel of the spring legs and bridge across the gap between two wall projections 47 characterised by the slit-like recesses 27.

We claim:

1. In a temperature-dependently actuated multi-way fluid flow control valve comprising first and second housing parts forming a housing, valve seats in said housing and a bimetallic disc between said seats, said bimetallic disc have a pair of opposite sides and each said side having an edge region, said disc being deflectable between first and second positions, said disc closing one of said seats when in said first position and another of said seats when in said second position to alter the fluid flow path through said valve, the improvement comprising mounting means floatingly mounting said bimetallic disc in said housing, said mounting means comprising spring means for selectively supporting said disc on each of said sides at the edge regions thereof, said disc being spring supported on one said side when said disc is in said first position to hold said one of said seats closed with said disc being spring loaded only on said one side and being spring supported on the other side when in said second position to hold said seat closed with said disc being spring loaded only on said other side.

2. A valve as claimed in claim 1, wherein said spring means comprises two oppositely situated springs, one on each side of said disc, each of said springs including spring legs and the spring legs of said spring on said one side of said disc being angularly offset from said spring legs of the other of said springs on said other side of said disc.

3. A vlave as claimed in claim 2, in which said two springs each include three legs, the legs of one of said springs being anularly offset by 60° from said legs of the other of said springs, and means defining recesses spaced apart around the perimeter of said housing, said legs extending into said recesses.

4. A valve as claimed in claim 3, in which said recesses include means defining abutment edges, said legs of said springs bearing against said abutment edges when said legs are inoperative upon said disc.

5. A valve as claimed in claim 4, in which said abutment edges extend above and below planes into which said disc deflects between said first position and said second position.

6. A valve as claimed in claim 1, further comprising an intermediate component enclosed between said first housing part and said second housing part, and means on said intermediate component forming one of said valve seats.

7. A valve as claimed in claim 6, in which said intermediate component includes wall portions disposed around the perimeter thereof and means forming crown-like recesses therein.

8. A valve as claimed in claim 7 in which said crown-like recesses include lower edges which form said abutment edges for said legs of one of said springs which is located in said first housing part.

9. A valve as claimed in claim 1, further comprising collar-like projections around said valve seats.

10. A valve as claimed in claim 9, in which said spring means comprise springs, said springs including spring arms which bear externally against said collar-like projections.

11. A valve as claimed in claim 3, in which each of said springs includes at least one peripheral spring leaf, and means forming abutments in said housing, said at least one peripheral spring leaf engaging between said abutments.

12. A valve as claimed in claim 11, in which each of said springs includes three spring leaves offset from each other at 120° angular intervals around said spring.

13. A valve as claimed in claim 11, further comprising pairs of pins provided in said housing and said spring leaves of each of said springs engaging between one of said pairs of pins.

* * * * *